United States Patent
Hiraoka (10) Patent No.: US 9,004,387 B2
(45) Date of Patent: Apr. 14, 2015

(54) DRAG KNOB AND FISHING REEL USING THE SAME

(71) Applicant: Shimano Inc., Sakai, Osaka (JP)

(72) Inventor: Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/010,177

(22) Filed: Aug. 26, 2013

(65) Prior Publication Data

US 2014/0151483 A1  Jun. 5, 2014

(30) Foreign Application Priority Data

Dec. 4, 2012 (JP) .................................. 2012-265031

(51) Int. Cl.
 *A01K 89/01* (2006.01)
 *A01K 89/02* (2006.01)
 *A01K 89/027* (2006.01)

(52) U.S. Cl.
 CPC ............... *A01K 89/02* (2013.01); *A01K 89/027* (2013.01)

(58) Field of Classification Search
 CPC ........................... A01K 89/027; A01K 89/033
 USPC .................. 242/245, 246, 302, 303, 304, 317
 See application file for complete search history.

(56) References Cited

U.S. PATENT DOCUMENTS

| | | | | |
|---|---|---|---|---|
| 3,072,356 A * | 1/1963 | Leuthner | | 242/317 |
| 4,488,689 A * | 12/1984 | Councilman | | 242/245 |
| 4,725,012 A * | 2/1988 | Councilman | | 242/245 |
| 4,796,828 A * | 1/1989 | Councilman | | 242/245 |
| 5,348,245 A * | 9/1994 | Sugawara | | 242/246 |
| 5,918,826 A * | 7/1999 | Arkowski | | 242/295 |
| 6,612,511 B2 * | 9/2003 | Kitajima | | 242/246 |
| 6,957,788 B2 * | 10/2005 | Kitajima | | 242/307 |
| 7,165,736 B2 * | 1/2007 | Kitajima | | 242/245 |
| 7,344,099 B1 * | 3/2008 | Ivie | | 242/246 |
| 7,419,113 B2 * | 9/2008 | Bin Abd Razak et al. | | 242/245 |
| 7,694,907 B2 * | 4/2010 | Chivarov et al. | | 242/303 |
| 7,789,335 B2 * | 9/2010 | Halterman, Jr. | | 242/246 |
| 2005/0023393 A1 * | 2/2005 | Kitajima | | 242/245 |
| 2009/0065620 A1 * | 3/2009 | Halterman, Jr. | | 242/246 |

FOREIGN PATENT DOCUMENTS

| | | |
|---|---|---|
| EP | 1472929 A1 | 11/2004 |
| EP | 2260700 A1 | 12/2010 |

(Continued)

OTHER PUBLICATIONS

European Search Report of corresponding EP Application No. 13 18 9982.5 dated Mar. 17, 2014.

*Primary Examiner* — Emmanuel M Marcelo
(74) *Attorney, Agent, or Firm* — Global IP Counselors (57) ABSTRACT

A drag knob for regulating drag force of a drag mechanism configured to brake rotation of a spool rotatably mounted to a reel unit of a fishing reel includes an operating member, a coil spring, a receiver member, and a slide member. The operating member is rotatably mounted to the reel unit. The coil spring extends and contracts in a rotary axis direction of the operating member in conjunction with rotation of the operating member. The receiver member is configured to receive urging force of the coil spring and apply drag force to the spool. The slide member is disposed between the coil spring and the receiver member in the rotary axis direction. The slide member has a friction coefficient less than a friction coefficient of the receiver member.

8 Claims, 9 Drawing Sheets

(56) References Cited

FOREIGN PATENT DOCUMENTS

| | | |
|---|---|---|
| GB | 1348283 | 3/1974 |
| JP | 06-10226 Y | 3/1994 |
| JP | 11-299399 A | 11/1999 |
| JP | 2002-039243 A | 2/2002 |
| JP | 2004-290112 A | 10/2004 |
| JP | 2012-205517 A | 10/2012 |

* cited by examiner

DRAG KNOB AND FISHING REEL USING THE SAME

CROSS-REFERENCE TO RELATED APPLICATIONS

This application claims priority to Japanese Patent Application No. 2012-265031 filed on Dec. 4, 2012. The entire disclosure of Japanese Patent Application No. 2012-265031 is hereby incorporated by reference in its entirety.

BACKGROUND

1. Field of the Invention

The present invention relates to a drag knob for regulating the drag force of a drag mechanism and a fishing reel using the same.

2. Background Art

In general, a fishing reel includes a drag mechanism for braking spool rotation. The drag mechanism is mainly formed by a drag knob and a friction part. The drag knob serves to regulate drag force. The friction part is formed by a plurality of drag washers. Further, the drag knob includes an operating member, a receiver member, and a coil spring. The receiver member is attached to the operating member while being rotatable relatively thereto. The coil spring is disposed between the operating member and the receiver member. In the drag knob, the coil spring accommodated therein extends and contracts when the operating member is rotated. Accordingly, urging force to be applied to the receiver member is changed. When the urging force is changed, pressing force to be applied to the friction part by the receiver member is changed, and thereby, drag force is regulated.

A coil spring in use for such a drag knob as described above is formed by spirally shaping a wire rod with a circular cross-section. Therefore, chances are that the coil spring is curved in its radial direction. To prevent such curving in the radial direction, a drag knob described in Japan Laid-open Patent Application Publication No. JP-A-2012-205517 uses such a coil spring as described in Japan Laid-open Patent Application Publication No. JP-A-2002-39243 and Examined Utility Model Application Publication No. JP-Y-H06-10226, in other words, a coil spring formed by spirally shaping a wire rod with a rectangular cross-section.

A variety of coil springs in use for such drag knob as described above are easily twisted and thus deformed when receiving force in its extended direction in conjunction with the rotation of the operating member. In other words, chances are that such various springs are twisted and deformed when receiving force in its circumferential direction. It should be noted that such torsional deformation remarkably occurs in use of such a coil spring with a rectangular cross-section as described in Japan Laid-open Patent Application Publication No. JP-A-2012-205517.

It is an advantage of the present invention to prevent deformation of a coil spring in a drag knob and a fishing reel.

SUMMARY

A drag knob for regulating drag force of a drag mechanism configured to brake rotation of a spool rotatably mounted to a reel unit of a fishing reel includes an operating member, a coil spring, a receiver member, and a slide member. The operating member is rotatably mounted to the reel unit. The coil spring extends and contracts in a rotary axis direction of the operating member in conjunction with rotation of the operating member. The receiver member is configured to receive urging force of the coil spring and apply drag force to the spool. The slide member is disposed between the coil spring and the receiver member in the rotary axis direction. The slide member has a friction coefficient less than a friction coefficient of the receiver member.

BRIEF DESCRIPTION OF THE DRAWINGS

Referring now to the attached drawings which form a part of this original disclosure.

DETAILED DESCRIPTION OF THE EXEMPLARY EMBODIMENTS

Figure 1:
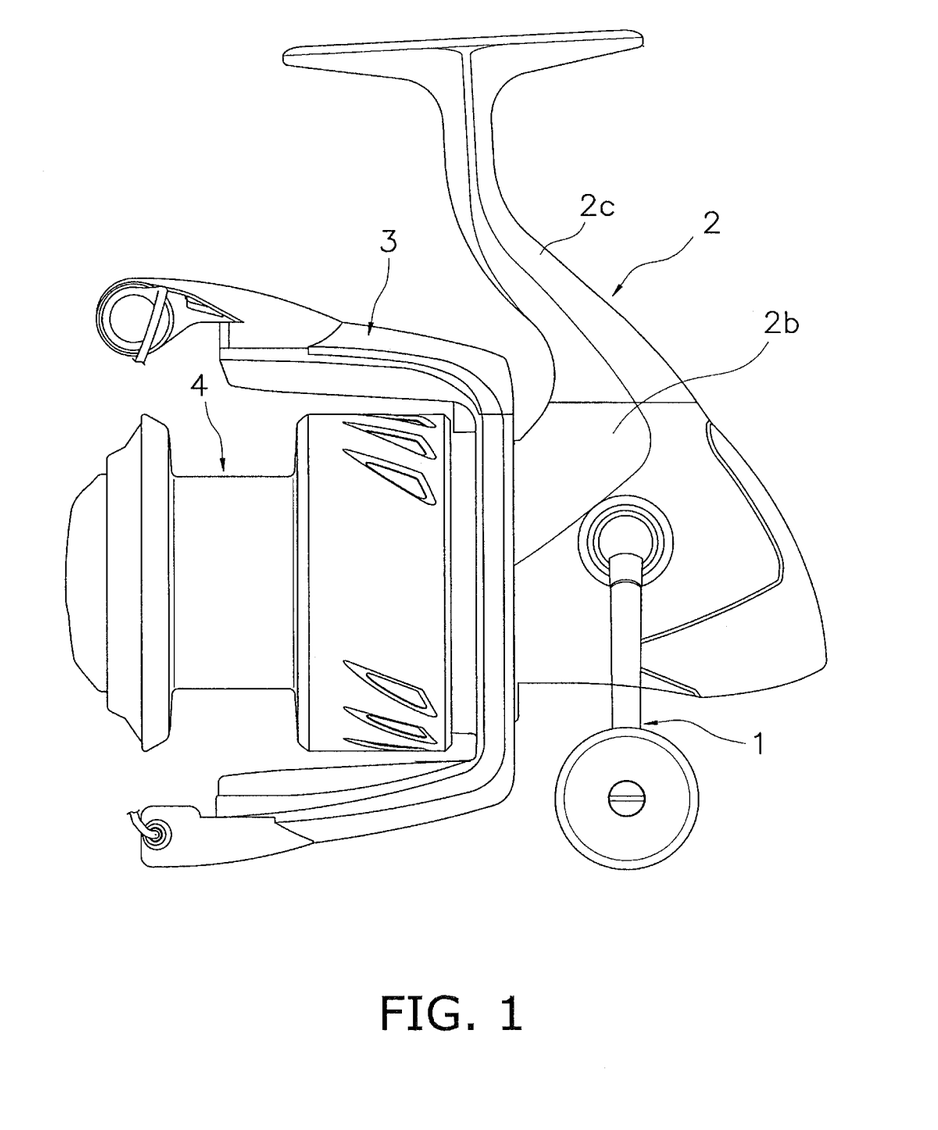
FIG. 1 is a side view of a spinning reel employing an exemplary embodiment of the present invention.
Figure 2:
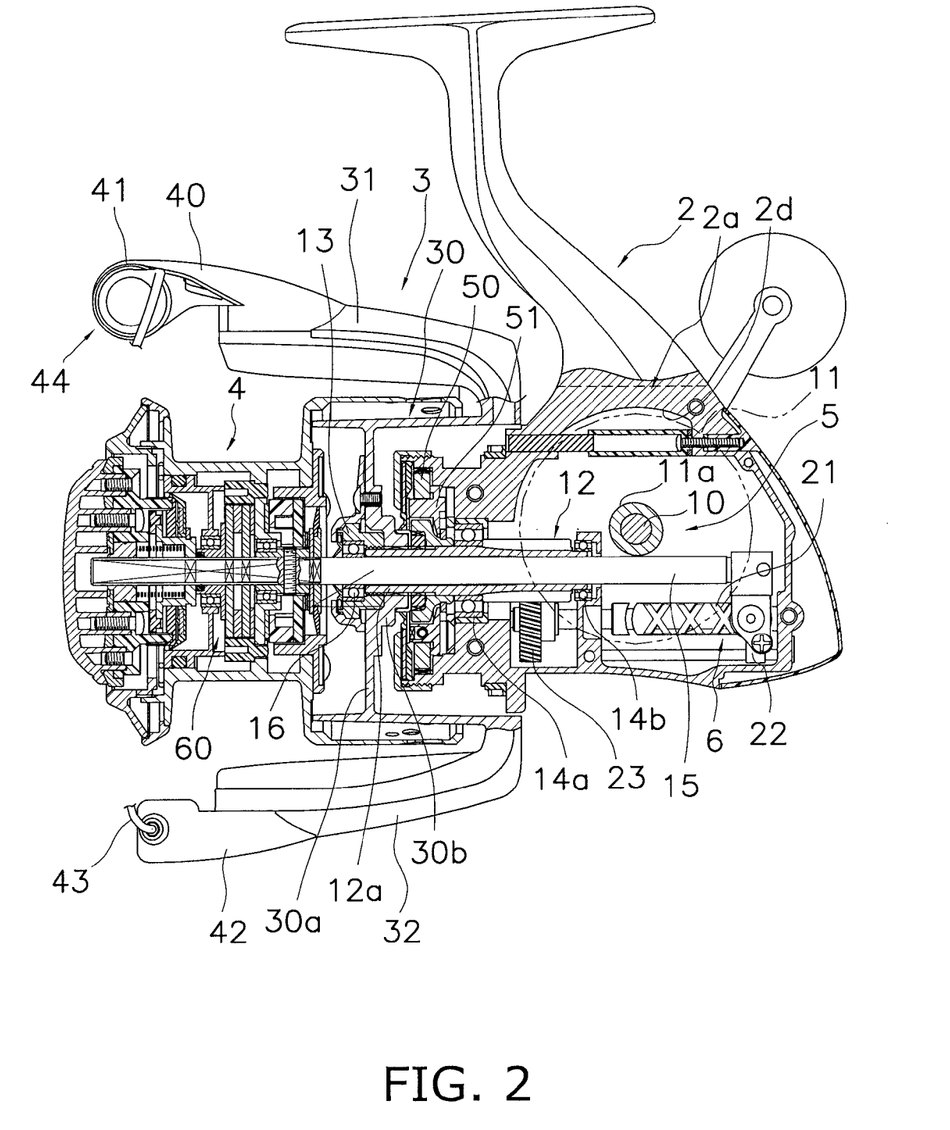
FIG. 2 is a cross-sectional side view of the spinning reel.

As illustrated in FIGS. 1 and 2, a spinning reel according to an exemplary embodiment of the present invention includes a handle 1, a reel unit 2 supporting the handle 1 in a rotatable state, a rotor 3, a spool 4, and mechanisms accommodated in the spool 4, i.e., a drag mechanism 60 and a drag sound producing mechanism 85. The rotor 3 is configured to cause the spool 4 to wind a fishing line thereabout, and is rotatably supported at the front of the reel unit 2. The spool 4 is configured to wind the fishing line onto the outer peripheral surface thereof, and is disposed at the front of the rotor 3 while being movable back and forth. It should be noted that the handle 1 is attachable to either the right side or the left side of the reel unit 2.

Structure of Reel Unit

As illustrated in FIGS. 1 and 2, the reel unit 2 includes a reel body 2a, a lid member 2b, and a fishing rod attachment leg 2c. The reel body 2a has an opening 2d. The lid member 2b is detachably attached to the reel body 2a for covering the opening 2d. The fishing rod attachment leg 2c extends obliquely upwards and forwards from the reel body 2a. The reel body 2a and the lid member 2b can be made of, for instance, aluminum alloy. The reel body 2a has an inner space. The inner space accommodates a rotor drive mechanism 5 and an oscillating mechanism 6, which are to be described.

The rotor drive mechanism 5 is configured to rotate the rotor 3 in conjunction with the rotation of the handle 1. As illustrated in FIG. 2, the rotor drive mechanism 5 includes a main gear 11 and a pinion gear 12. The main gear 11 is configured to be rotated with a main gear shaft 11a to which a handle shaft 10 of the handle 1 is fixed. The pinion gear 12 is meshed with the main gear 11. The pinion gear 12 is formed in a tubular shape and has a front portion 12a. The front portion 12a is fixed to the rotor 3 by a nut 13 while penetrating through the center part of the rotor 3. The pinion gear 12 is rotatably supported by the reel body 2a through bearings 14a and 14b. Specifically, the bearings 14a and 14b are attached to the reel body 2a while being disposed at a predetermined interval. The bearing 14a supports the axially intermediate portion of the pinion gear 12, whereas the bearing 14b supports the axially rear end portion of the pinion gear 12.

The oscillating mechanism 6 is configured to move back and forth the spool 4 in order to uniformly wind the fishing line. In more detail, the oscillating mechanism 6 is configured to move a spool shaft 15 (an exemplary rotary shaft) in a back-and-forth direction in order to move the spool 4 in the same direction as the spool shaft 15. The spool shaft 15 is coupled to the center part of the spool 4 through the drag mechanism 60. The oscillating mechanism 6 includes a worm shaft 21, a slider 22, and an intermediate gear 23. The worm shaft 21 is disposed below and in parallel to the spool shaft 15. The slider 22 is configured to be moved along the worm shaft 21 in the back-and-forth direction. The intermediate gear 23 is fixed to the tip of the worm shaft 21. The rear end of the spool shaft 15 is non-rotatably fixed to the slider 22. The intermediate gear 23 is meshed with the pinion gear 12.

The spool shaft 15 is disposed while axially penetrating through the center part of the pinion gear 12. The spool shaft 15 is configured to be reciprocated back and forth inside the pinion gear 12 by the oscillating mechanism 6. The spool shaft 15 is supported while being axially movable. Specifically, the intermediate portion of the spool shaft 15 is supported by a bearing 16 attached to the inside of the nut 13, whereas the rear portion of the spool shaft 15 is supported by the inner peripheral surface of the rear portion of the pinion gear 12. It should be noted that the spool shaft 15 is non-rotatable, whereas the pinion gear 12 is rotatable relatively to the spool shaft 15. Electroless Ni plating is applied to the surface of the spool shaft 15. This is intended to prevent the spool shaft 15 from getting stuck with the pinion gear 12 when the spool shaft 15 is moved back and forth while being rotated relatively to the pinion gear 12. The spool shaft 15 has a pair of lock surfaces 15a and a pair of male threaded portions 15b on the tip thereof. The lock surfaces 15a are composed of a pair of parallel surfaces provided for an anti-rotation purpose. The male threaded portions 15b are provided for a drag regulation purpose.

Structure of Rotor

The rotor 3 has a cylindrical part 30, a first rotor arm 31, and a second rotor arm 32. The first rotor arm 31 and the second rotor arm 32 are disposed laterally to the cylindrical part 30 while being opposed to each other. The first rotor arm 31 and the second rotor arm 32 are integrally formed with the cylindrical part 30.

The cylindrical part 30 has a front wall 30a in the front part thereof. The front wall 30a has a boss 30b in the center part thereof. The boss 30b has a through hole in the center part thereof. The front portion 12a of the pinion gear 12 and the spool shaft 15 penetrate through the through hole. Further, the nut 13 is disposed in front of the front wall 30a. The rotor 3 is fixed to the front portion 12a of the pinion gear 12 by the nut 13.

The first rotor arm 31 forwardly extends from the cylindrical part 30 while being curved outward in a convex shape. A first bail support member 40 is pivotably attached to the outer peripheral side of the tip of the first rotor arm 31. A line roller 41 is attached to the tip of the first bail support member 40 for guiding the fishing line to the spool 4. The second rotor arm 32 forwardly extends from the cylindrical part 30 while being outwardly curved in a convex shape. A second bail support member 42 is pivotably attached to the outer peripheral side of the tip of the second rotor arm 32. A bail 43 is fixed to both of the line roller 41 and the second bail support member 42. The bail 43 is formed by curving a wire rod in a roughly U-shape. The first bail support member 40, the second bail support member 42, the line roller 41, and the bail 43 form a bail arm 44. The bail arm 44 is pivotable between a fishing-line guide position illustrated in FIG. 1 and a fishing-line release position inverted therefrom.

The cylindrical part 30 of the rotor 3 accommodates an anti-reverse mechanism 50 in the interior thereof. The anti-reverse mechanism 50 is configured to prevent/allow the reverse rotation of the rotor 3. The anti-reverse mechanism 50 includes a one-way clutch 51 and a switch lever 52 (not illustrated in the figures). The one-way clutch 51 is of a roller type with a free-wheeling inner race. The switch lever 52 is configured to switch the one-way clutch 51 between an activation state (or referred to as a reverse preventing state) and a deactivation state (or referred to as a reverse allowing state).

Structure of Spool

Figure 3:
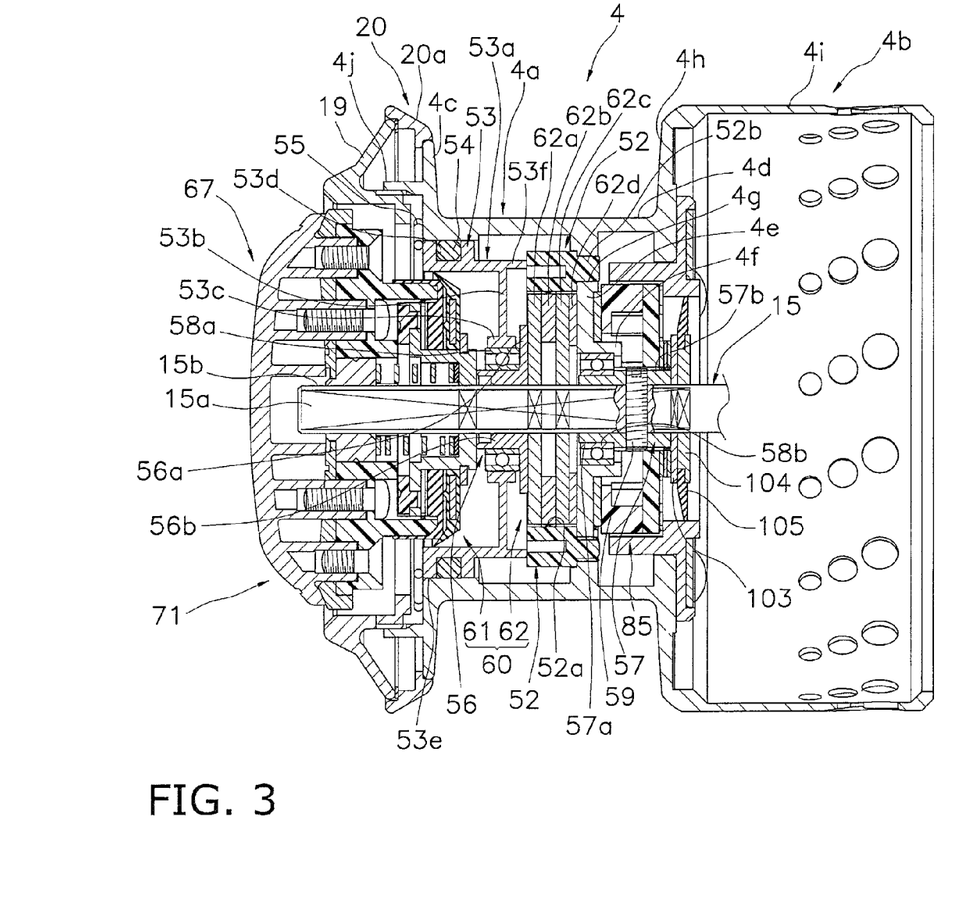
FIG. 3 is a cross-sectional side view of a spool.

As illustrated in FIG. 2, the spool 4 is disposed between the first and second rotor arms 31 and 32 of the rotor 3. The spool 4 is attached to the tip of the spool shaft 15. As illustrated in FIG. 3, the spool 4 includes a bobbin trunk 4a, a skirt 4b, and a front flange 4c. The bobbin trunk 4a is made of, for instance, aluminum alloy. The skirt 4b is integrally formed on the rear end of the bobbin trunk 4a. The front flange 4c is integrally formed on the front end of the bobbin trunk 4a. The spool 4 accommodates the drag mechanism 60 and the drag sound producing mechanism 85 in the interior thereof. The drag mechanism 60 is configured to brake the spool 4 for applying a set amount of drag force to the spool 4. The drag sound producing mechanism 85 is configured to produce sound in drag activation.

The bobbin trunk 4a is a cylindrical member, and the outer peripheral surface thereof is formed in parallel to that of the spool shaft 15. The bobbin trunk 4a includes a tubular portion 4d, a support wall portion 4e, and a shaft strut portion 4f. The tubular portion 4d is a portion that the fishing line is wound thereabout. The support wall portion 4e is a disc-shaped portion integrally formed on the inner peripheral surface of the tubular portion 4d. The shaft strut portion 4f is a tubular portion formed on the inner periphery of the support wall portion 4e.

The skirt 4b has a rear flange portion 4h and a cylindrical portion 4i. The rear flange portion 4h radially extends from the rear end of the bobbin trunk 4a. The cylindrical portion 4i is a tubular portion backwardly extending from the outer periphery of the rear flange portion 4h. The cylindrical part 30 of the rotor 3 is disposed inside the cylindrical portion 4i.

A spool ring 20 is attached to the outer peripheral surface of the front flange 4c. The spool ring 20 is made of metal, and serves to smoothly release the fishing line from the bobbin trunk 4a. The spool ring 20 has a slope 20a with a diameter increasing from one end to the other end. The spool ring 20 is fixed to the front flange 4c by a ring fixing member 19. The ring fixing member 19 is screwed into a female threaded portion 4j. The female threaded portion 4j is a tubular portion forwardly protruding from the front flange 4c.

Figure 4:
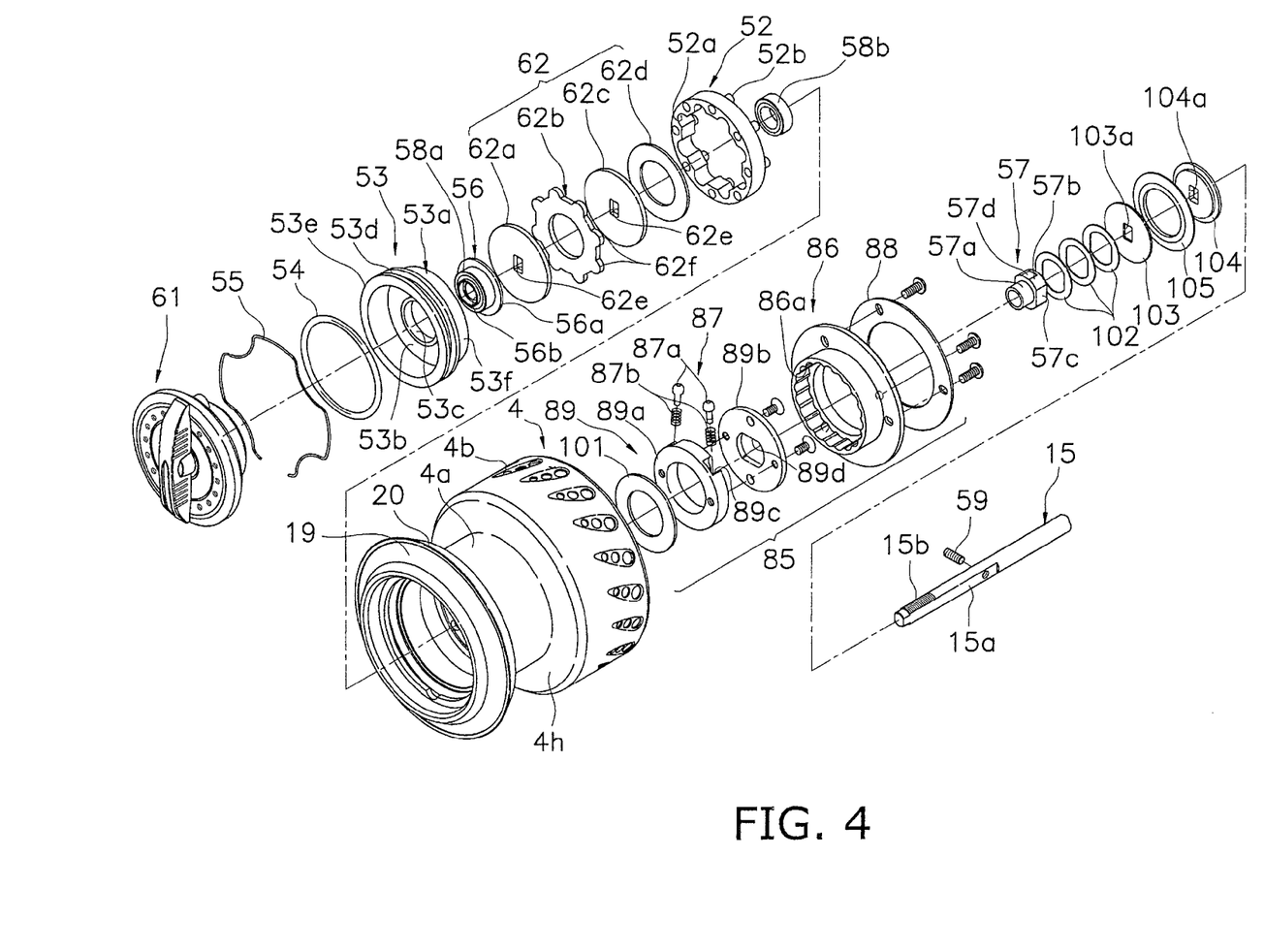
FIG. 4 is an exploded perspective view of the spool.

As illustrated in FIGS. 3 and 4, a tubular drag accommodation part 52 is attached to the front side of the support wall portion 4e within the bobbin trunk 4a, while being unitarily rotatable therewith. The tubular drag accommodation part 52 accommodates the drag mechanism 60 in the interior thereof. A tubular support part 53 is attached in front of the tubular drag accommodation part 52. The tubular support part 53, together with the shaft strut portion 4f, serves to support the spool 4 for making the spool 4 rotatable with respect to the spool shaft 15.

The tubular drag accommodation part 52 accommodates a friction part 62 (to be described) of the drag mechanism 60 in the interior thereof. The tubular drag accommodation part 52 has a plurality of (e.g., eight) engaging recesses 52a formed on the inner peripheral surface thereof. The engaging recesses 52a are semicircular recesses aligned at intervals in the circumferential direction. Further, the spool 4 has a plurality of (e.g., four) engaging holes 4g bored through the support wall portion 4e. The engaging holes 4g are aligned at intervals in the circumferential direction. Further, the tubular drag accommodation part 52 has a plurality of (e.g., four) engaging protrusions 52b on the rear face thereof. The engaging protrusions 52b are engaged with the engaging holes 4g, respectively. Accordingly, the tubular drag accommodation part 52 is unitarily rotated with the spool 4.

The tubular support part 53 has an tubular attachment portion 53a, a circular wall portion 53b, and a tubular shaft strut portion 53c. The tubular attachment portion 53a is fitted to the inner peripheral surface of the tubular portion 4d of the bobbin trunk 4a. The circular wall portion 53b is integrally formed on the inner peripheral surface of the tubular attachment portion 53a. The shaft strut portion 53c is formed on the inner periphery of the circular wall portion 53b. A front side outer peripheral surface 53e of the tubular attachment portion 53a has a diameter greater than that of a rear side outer peripheral surface 53f, and is fitted to the inner peripheral surface of the tubular portion 4d. An O-ring 54 is attached to the front side outer peripheral surface 53e for preventing liquid from intruding behind the tubular support part 53 through the clearance between the tubular portion 4d and the tubular support part 53. The O-ring 54 is attached to an annular groove 53d formed on the front side outer peripheral surface 53e of the tubular support part 53. The rear face of the tubular attachment portion 53a makes contact with the front face of the tubular drag accommodation part 52. The tubular support part 53 is retained together with the tubular drag accommodation part 52 by a retainer spring 55. The retainer spring 55 is made of a wire rod, and is attached to the inside of the spool 4 while being disposed in front of the tubular support part 53. The retainer spring 55 is held in the clearance between the front face of the bobbin trunk 4a and the rear face of the ring fixing member 19 within the spool 4.

A first support part 56 and a second support part 57 are fitted onto the outer peripheral surface of the spool shaft 15, and two bearings 58a and 58b are attached to the first and second support parts 56 and 57, respectively. The spool 4 is thereby supported while being rotatable with respect to the spool shaft 15. The first support part 56 is rotatably attached to the spool shaft 15. The first support part 56 is a brimmed cylindrical member, and has a brimmed portion 56a and a tubular portion 56b. The tubular portion 56b has a diameter less than that of the brimmed portion 56a. The first support part 56 is disposed between a drag knob 61 and the friction part 62 while making contact with both of them. An inner race of the bearing 58a is swaged to the outer peripheral surface of the tubular portion 56b of the first support part 56. An outer race of the bearing 58a is attached to the shaft strut portion 53c of the tubular support part 53. With the structure, the bearing 58a can be easily retained with respect to the outer peripheral surface of the tubular portion 56b of the first support part 56.

The second support part 57 is fixed to the rear portions of the lock surfaces 15a formed on the front side part of the spool shaft 15. The second support part 57 is a two (large and small) tier tubular member having a small diameter portion 57a and a large diameter portion 57b. An inner race of the bearing 58b is attached to the small diameter portion 57a. An outer race of the bearing 58b is attached to the shaft strut portion 4f of the bobbin trunk 4a. A pair of first lock surfaces 57c and a pair of second lock surfaces 57d are formed on the large diameter portion 57b. The first lock surfaces 57c are composed of surfaces formed in parallel to each other. The second lock surfaces 57d are formed perpendicularly to the first lock surfaces 57c. The second support part 57 is non-rotatably fixed to the spool shaft 15 by a lock screw 59. The lock screw 59 is disposed while penetrating through the first lock surfaces 57c. A slotted hollow set screw is herein used as the lock screw 59, and is screwed through the first lock surfaces 57c into a threaded hole penetrating through the lock surfaces 15a.

In the support structure of the spool 4 structured as described above, the tubular support part 53 is disposed in front of the support wall portion 4e of the bobbin trunk 4a, while the bearing 58a is disposed in the tubular support part 53. Therefore, the axial interval between the two bearings 58a and 58b can extend in comparison with a well-known structure that two bearings are aligned in the shaft strut portion 4f. With the structure, the support interval of the spool 4 can extend and wobbling of the spool 4 can be inhibited.

Structure of Drag Mechanism

The drag mechanism 60 is a mechanism configured to brake the rotation of the spool 4 in the fishing-line releasing direction for applying drag force to the spool 4. As illustrated in FIGS. 3 and 4, the drag mechanism 60 includes the drag knob 61 and the friction part 62 having, for instance, four drag washers 62a to 62d.

Structure of Drag Knob

Figure 5:
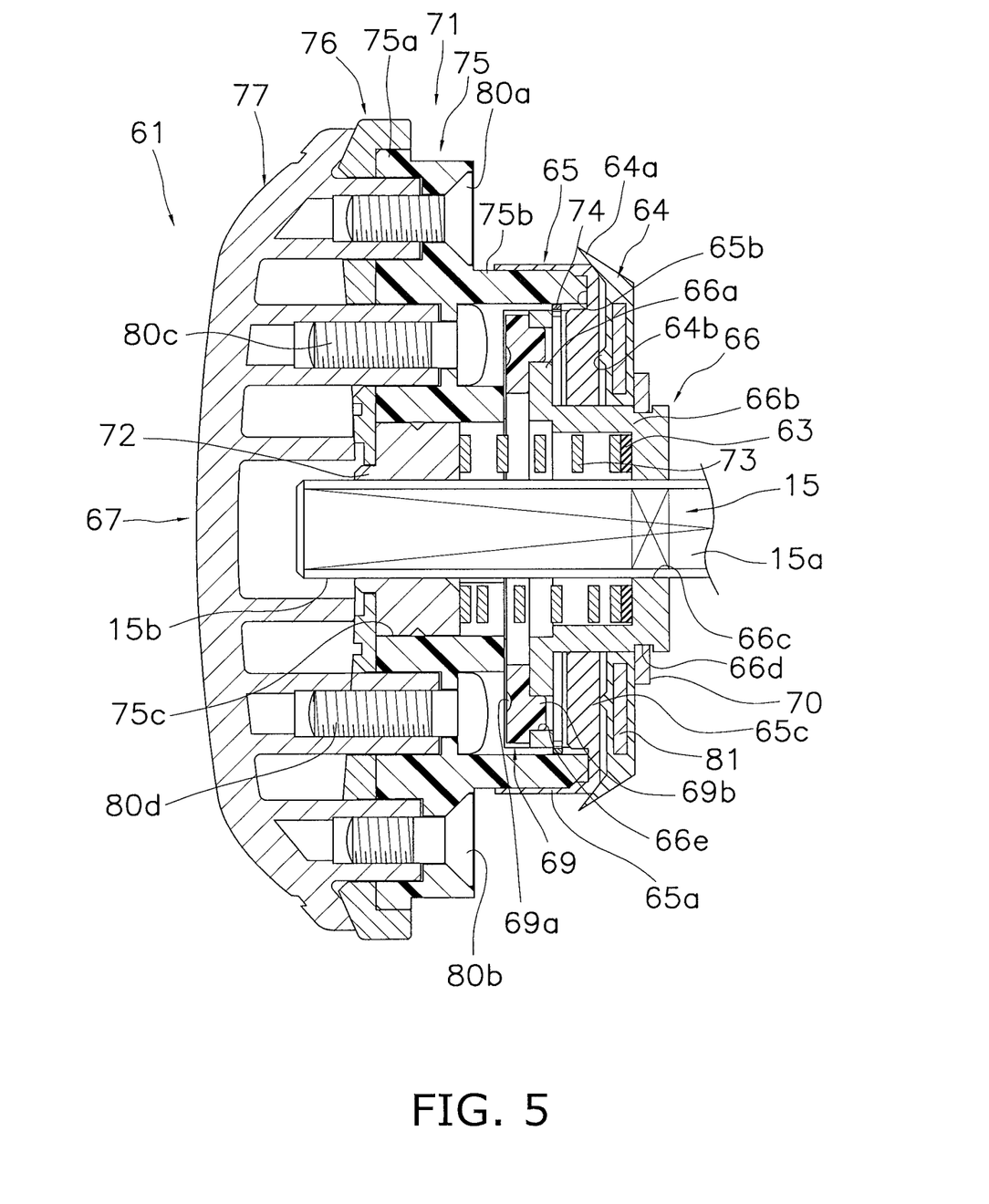
FIG. 5 is a cross-sectional side view of a drag knob.
Figure 6:
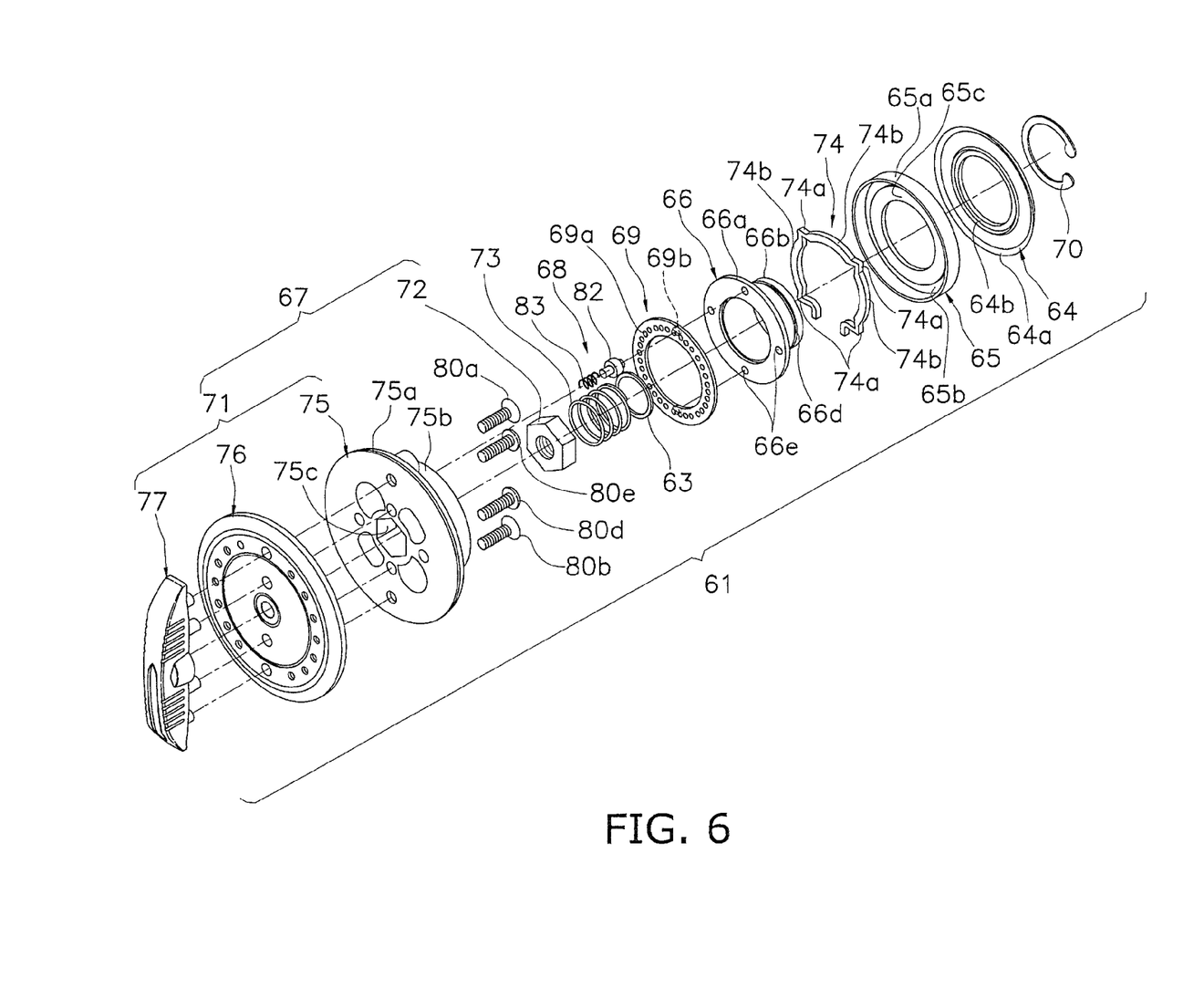
FIG. 6 is an exploded perspective view of the drag knob.

As illustrated in FIGS. 5 and 6, the drag knob 61 includes an operating member 67, a coil spring 73, a receiver member 66 and a slide member 63. Further, the drag knob 61 further includes a coupling member 74, a first seal member 64, a second seal member 65, and a knob sound producing mechanism 68. The coupling member 74 couples the receiver member 66 and the operating member 67 while these members 66 and 67 are rotatable and axially immovable. The first seal member 64 seals the clearance between the drag knob 61 and the spool 4. The second seal member 65 seals the clearance between the receiver member 66 and the operating member 67. The knob sound producing mechanism 68 is configured to produce sound by relative rotation between the receiver member 66 and the operating member 67.

The receiver member 66 is a member for receiving the urging force of the coil spring 73 and for applying drag force to the spool 4. The receiver member 66 is a brimmed tubular member made of metal such as aluminum alloy. The receiver member 66 has a ring-shaped brimmed portion 66a and a cylindrical portion 66b having a diameter less than that of the brimmed portion 66a. The receiver member 66 is mounted onto the spool shaft 15 while being non-rotatable and axially movable.

The cylindrical portion 66b has an oval-like lock slot 66c formed on the inner periphery thereof. The lock slot 66c is non-rotatably engaged with the lock surfaces 15a of the spool shaft 15. The cylindrical portion 66b has an annular groove 66d on the outer peripheral surface thereof. The annular groove 66d is formed behind a part onto which the first seal member 64 is attached. The rear end surface of the cylindrical portion 66b makes contact with the drag washer 62a of the friction part 62 through the first support part 56.

The operating member 67 is disposed in opposition to the receiver member 66 while being rotatable relatively thereto. The operating member 67 is a member rotatably mounted to the reel unit 2. The operating member 67 is screwed onto the spool shaft 15, while protruding in a tubular shape towards the receiver member 66 so as to cover the brimmed portion 66a. The operating member 67 includes a knob body 71 and a nut part 72. The nut part 72 is attached to the knob body 71 while being non-rotatable and axially movable. Further, the nut part 72 is screwed onto the spool shaft 15.

The knob body 71 includes a knob main body 75, a cover part 76, and an operating knob 77. The knob main body 75 is made of synthetic resin. The cover part 76 is a disc-shaped part made of metal, and is fixed to the front face of the knob main body 75. The operating knob 77 is made of metal, and is fixed to the front face of the cover part 76 along its radial direction.

The knob main body 75 has a disc portion 75a and a protruding portion 75b. The protruding portion 75b is formed in a tubular shape and has a diameter less than that of the disc portion 75a. Four bolt members 80a to 80d are inserted into the disc portion 75a from its rear surface side and are further screwed into the operating knob 77 through the cover part 76. The cover part 76 and the operating knob 77 are thereby fixed to the knob main body 75.

The protruding portion 75b protrudes in a tubular shape towards the receiver member 66 so as to cover the brimmed portion 66a of the receiver member 66. The brimmed portion 66a of the receiver member 66, which is covered with the protruding portion 75b, is retained by the coupling member 74 attached to the inner peripheral surface of the protruding portion 75b. The receiver member 66 and the operating member 67 are thereby coupled while being rotatable relatively to each other and axially immovable. The knob main body 75 has a nut accommodating portion 75c in the inner periphery thereof. The nut accommodating portion 75c is formed for accommodating the nut part 72. The nut part 72 is accommodated in the nut accommodating portion 75c, while being integrally rotatable with and axially movable with respect to the knob main body 75.

The cover part 76 is formed for covering the front face and a part of the outer peripheral surface of the disc portion 75a of the knob main body 75. As a result, the knob main body 75, which is made of resin and composes a mechanism part of the drag knob 61, is hidden within the spool 4 without being exposed to the outside. The front face of the cover part 76 is recessed such that the thickness thereof is gradually reduced towards the center part thereof. The operating knob 77 is disposed along the diameter of the cover part 76 and is forwardly protruding therefrom.

The coupling member 74 is a member formed by bending an elastic wire rod made of metal. The coupling member 74 is a C-shaped spring member and has four corners 74a corresponding to the corners of a roughly square shape. The coupling member 74 is attached to the inner peripheral surface of the protruding portion 75b, while the corners 74a are engaged with an annular groove formed on the inner peripheral surface of the protruding portion 75b. The coupling member 74 retains the receiver member 66 while three circular-arc sides 74b among the corners 74a make contact with the rear surface of the brimmed portion 66a.

The nut part 72 is a hexagonal nut, for instance, and is screwed onto the male threaded portions 15b formed on the outer peripheral surface of the tip of the spool shaft 15. The nut part 72 is configured to be moved along the spool shaft 15 when being unitarily rotated with the knob main body 75. Then, the coil spring 73 extends and contracts.

Figure 7:
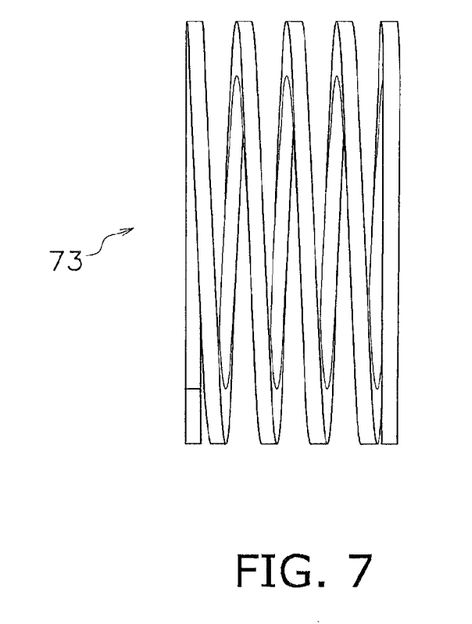
FIG. 7 is a side view of a coil spring.
Figure 8:
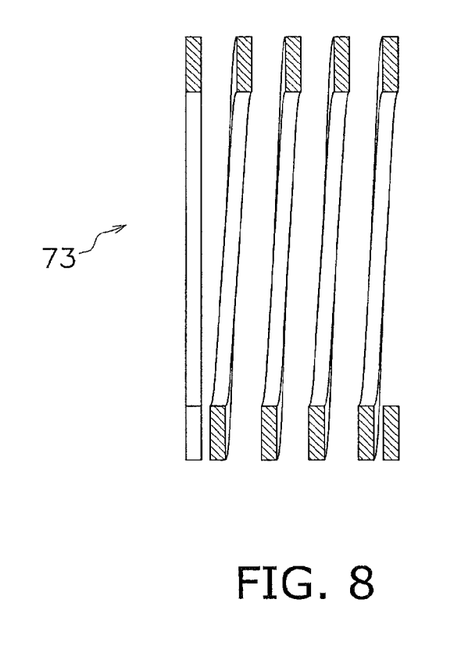
FIG. 8 is a cross-sectional side view of the coil spring.

The coil spring 73 extends and contracts in the direction of the spool shaft 15 in conjunction with the rotation of the operating member 67. The coil spring 73 is disposed between the operating member 67 and the receiver member 66. When described in detail, the slide member 63 is disposed between the coil spring 73 and the receiver member 66. Therefore, the coil spring 73 is disposed between the operating member 67 and the slide member 63. It should be noted that the coil spring 73 is preferably disposed in a compressed state. As illustrated in FIGS. 7 and 8, the coil spring 73 has an axial cross-section formed in a rectangular shape. Specifically, the coil spring 73 is produced by forming a wire rod with a rectangular cross-section in a spiral shape. The inner diameter of the coil spring 73 is greater than the outer diameter of the spool shaft 15. Therefore, the coil spring 73 and the spool shaft 15 do not make contact with each other.

The slide member 63 is disposed between the coil spring 73 and the receiver member 66. The slide member 63 is pressed onto the receiver member 66 by the urging force of the coil spring 73. The slide member 63 is a ring-shaped member, and the inner and outer diameters thereof are roughly equal to those of the coil spring 73. The slide member 63 is preferably made of a material with a friction coefficient less than that of the material forming the receiver member 66. For example, the slide member 63 can be formed in a washer shape.

The first seal member 64 is a disc-shaped member made of, for instance, synthetic rubber. The first seal member 64 is disposed between the inner peripheral surface of the tubular attachment portion 53a of the tubular support part 53 of the spool 4 and the outer peripheral surface of the cylindrical portion 66b of the receiver member 66. The first seal member 64 is restricted from backwardly moving by a retainer ring 70 attached to the annular groove 66d. The inner peripheral surface of the first seal member 64 is attached onto the cylindrical portion 66b of the receiver member 66, while the outer periphery of the first seal member 64 makes contact with the inner peripheral surface of the tubular attachment portion 53a of the tubular support part 53. A reinforcement plate 81 is buried into the first seal member 64. For example, the reinforcement plate 81 is a disc-shaped member made of stainless alloy. In molding the first seal member 64, the reinforcement plate 81 is inserted into a die and is then insert-molded into the first seal member 64. The first seal member 64 has a lip portion 64a on the outer peripheral part thereof. The lip portion 64a has a tapered cross-section, and makes contact with the inner peripheral surface of the tubular attachment portion 53a. The lip portion 64a is forwardly slanted. Further, the first seal member 64 has an annular protruding portion 64b on the intermediate part thereof in the radial direction. The annular protruding portion 64b has a triangular cross-section and is forwardly protruding. The annular protruding portion 64b makes contact with the rear face of the second seal member 65. Further, the front surface of the lip portion 64a of the first seal member 64 also makes contact with the rear end of the outer peripheral surface of the second seal member 65.

For example, the second seal member 65 is a closed-end tubular member made of synthetic rubber. The second seal member 65 is disposed between the first seal member 64 and the operating member 67. The second seal member 65 has a contact portion 65a, an annular recessed portion 65b, and a disc portion 65c. The contact portion 65a is a tubular portion contactable with the outer peripheral surface of the protruding portion 75b of the knob main body 75 in the operating member 67. The annular recessed portion 65b is formed on the inner peripheral side of the contact portion 65a, and is engaged with the rear end surface of the protruding portion 75b. The disc portion 65c is attached to the outer peripheral surface of the cylindrical portion 66b of the receiver member 66.

In the drag knob 61 structured as described above, the second seal member 65, which is disposed between the receiver member 66 and the operating member 67, has the tubular contact portion 65a making contact with the outer peripheral surface of the protruding portion 75b of the knob main body 75 of the operating member 67. Further, the second seal member 65 seals the clearance between the receiver member 66 and the operating member 67. On the other hand, the first seal member 64, which is disposed between the spool 4 and the receiver member 66, seals the clearance between the spool 4 and the receiver member 66. Here, the second seal member 65 makes contact at its tubular contact portion 65a with the outer peripheral surface of the protruding portion 75b of the knob main body 75 of the operating member 67. Therefore, with the integrated structure of the first seal member 64 and the second seal member 65, the second seal member 65 is less easily deformed even when the first seal member 64 is pressed down by water pressure acting thereon. Thus, even when water pressure acts on the two seal members 64 and 65, liquid less easily flows into the drag knob 61 through the clearance between the receiver member 66 and the operating member 67. In addition, the first seal member 64 and the second seal member 65 are separate members. Therefore, even when the first seal member 64 is deformed, the second seal member 65 is less easily deformed and liquid much less easily flows into the drag knob 61.

As illustrated in FIG. 6, the knob sound producing mechanism 68 includes a sound protruding disc 69, a hitting pin 82, and a coil spring 83. The sound producing disc 69 has sound producing recesses 69a. The hitting pin 82 is attached to the knob main body 75 while being extendable therefrom and retractable thereto. The coil spring 83 urges the hitting pin 82 towards the sound producing recesses 69a. The hitting pin 82 is a pin member having a large-diameter center portion, a small-diameter tip end and a small-diameter base end. Further, the tip end is rounded in a hemispherical shape. When the operating member 67 and the receiver member 66 are rotated relatively to each other in a drag operation, the hitting pin 82 repeatedly collides with the sound producing recesses 69a, and thereby, sound is produced.

The sound producing disc 69 is a member made of synthetic resin, and has the plural sound producing recesses 69a formed on the front surface thereof. The sound producing recesses 69a are aligned at intervals along the circumferential direction. The sound producing disc 69 has a plurality of coupling protrusions 69b formed on the rear surface thereof. The coupling protrusions 69b are fitted into a plurality of coupling holes 66e bored through the brimmed portion 66a. With the structure, the sound producing disc 69 is prevented from rotating with respect to the receiver member 66.

Structure of Friction Part

The friction part 62 includes the plural (e.g., four) drag washers 62a to 62d. As illustrated in FIG. 4, the drag washer 62a is a disc member made of metal, and makes contact with the receiver member 66 through the first support part 56 while being non-rotatable with respect to the spool shaft 15. The drag washer 62b is a disc member made of metal, and is unitarily rotatable with the spool 4. Similarly to the drag washer 62a, the drag washer 62c is a disc member made of metal, and is non-rotatable with respect to the spool shaft 15. The drag washer 62d is a disc member made of, for instance, either felt or graphite, and is rotatable with respect to the spool 4 and the spool shaft 15. Each of the drag washers 62a and 62c has a lock slot 62e in the center part thereof. Each lock slot 62e is formed in an oval-like shape and is engaged with the lock surfaces 15a formed on the tip side portion of the spool shaft 15. The drag washer 62b has a plurality of (e.g., eight) tabs 62f protruding radially outwards from the outer peripheral surface thereof. The tabs 62f are engaged with the plural engaging recesses 52a, which are axially formed on the inner peripheral surface of the tubular drag accommodation part 52 while being aligned at intervals along the circumferential direction. Accordingly, the drag washer 62b is unitarily rotatable with the spool 4.

The drag washers 62a to 62d are retained by the first support part 56 supporting the tubular support part 53. Therefore, the drag washers 62a to 62d cannot be attached or detached unless the retainer spring 55, which is disposed in front of the tubular support part 53, is detached.

Structure of Drag Sound Producing Mechanism

The drag sound producing mechanism 85 is a mechanism configured to produce sound when the spool shaft 15 and the spool 4 are rotated relatively to each other by drag actuation. As illustrated in FIG. 4, the drag sound producing mechanism 85 includes a first sound producing member 86 and a second sound producing member 87. The first sound producing member 86 is attached to the rear surface of the rear flange portion 4h of the spool 4, and is thereby unitarily rotated with the spool 4. The second sound producing member 87 is configured to repeatedly collide with the first sound producing member 86.

The first sound producing member 86 is a brimmed cylindrical member made of metal and has a large number of circular-arc shaped sound producing recesses 86a formed on the inner peripheral surface thereof. A nameplate 88 is disposed on the rear surface of the first sound producing member 86. The first sound producing member 86, together with the name plate 88, is fixed to the rear surface of the rear flange portion 4h by screws.

The second sound producing member 87 includes two hitting pins 87a and two spring members 87b. The hitting pins 87a protrude/retract towards/from the sound producing recesses 86a. The spring members 87b urge the hitting pins 87a towards the sound producing recesses 86a. The hitting pins 87a are accommodated in a tubular accommodation member 89. The tubular accommodation member 89 is non-rotatably engaged with the second lock surfaces 57d of the second support part 57. The accommodation member 89 includes an accommodation main body 89a and a cover 89b. The accommodation main body 89a is a cylindrical part with a large thickness and has two accommodation grooves 89c. The accommodation grooves 89c accommodate the hitting pins 87a for allowing them to protrude/retract therefrom/thereto. The cover 89b is a disc-shaped part fixed to the accommodation main body 89a by screws. Thus, the accommodation grooves 89c are covered with the cover 89b. The cover 89b is also engaged with the second lock surfaces 57d. The two accommodation grooves 89c of the accommodation main body 89a are opened on the outer peripheral surface of the accommodation main body 89a. The accommodation grooves 89c are formed such that their interval is reduced towards the opened side. The cover 89b has a lock slot 89d formed on the inner peripheral surface thereof. The lock slot 89d is engaged with the second lock surfaces 57d. A washer 101 is disposed between the accommodation member 89 and the support wall portion 4e of the spool 4.

Three spool position adjusting washers 102 and two restriction washers 103 and 104 are attached to the rear surface of the cover 89b. The spool position adjusting washers 102 are made of synthetic resin, for instance, and are engaged with the first lock surfaces 57c of the second support part 57. The restriction washers 103 and 104 restrict the spool 4 from moving rearwards. Each of the restriction washers 103 and 104 has a lock slot 103a/104a formed in the inner peripheral part thereof. The lock slots 103a and 104a are engaged with the lock surfaces 15a of the spool shaft 15. Therefore, the restriction washers 103 and 104 are non-rotatable with respect to the spool shaft 15. The restriction washer 104 is a stepped washer and holds a third seal member 105 together with the restriction washer 103. The outer peripheral part of the third seal member 105 makes contact with the inner peripheral surface of the first sound producing member 86. The third seal member 105 is disposed for preventing liquid from flowing into the spool 4 including the friction part 62 from the rear surface of the spool 4.

Operation and Action of Reel

Prior to fishing, the braking force for braking the rotation of the spool 4 (i.e., drag force) is regulated in accordance with the size and sort of fish. The drag knob 61 is rotated for regulating the drag force. When the drag knob 61 is rotated in the clockwise direction, for instance, the nut part 72 screwed onto the spool shaft 15 is moved to the rearward (i.e., rightward in FIGS. 3 and 5). In conjunction with moving of the nut part 72, the coil spring 73 urges the receiver member 66 through the slide member 63 to the rearward. On the other hand, the receiver member 66 receives the urging force of the coil spring 73 and applies drag force to the spool 4. In more detail, the receiver member 66 presses the friction part 62 through the first support part 56, and the respective drag washers 62a to 62d, composing the friction part 62, are frictionally in contact with each other. The drag force is thereby applied to the spool 4. At this time, the receiver member 66 and the operating member 67 are rotated relatively to each other, and the hitting pin 82 thereby repeatedly collides with the sound producing recesses 69a at predetermined time intervals. Thus, crisp light clicking sounds are produced. It should be noted that the drag force is increased in accordance with the amount of turning the drag knob 61 in the clockwise direction.

In casting, the bail arm 44 is flipped over to a fishing-line releasing position. Accordingly, the first bail support member 40 and the second bail support member 42 pivot. Under the condition, the fishing rod is cast while the fishing line is hooked by the index finger of the angler's hand grabbing the fishing rod. Accordingly, the fishing line is released forward at a high momentum by the weight of the terminal tackle. When the handle 1 is rotated in the fishing-line winding direction under the condition, the rotor drive mechanism 5 rotates the rotor 3 in the fishing-line winding direction. A bail flip mechanism (not illustrated in the figures) herein returns the bail arm 44 to the fishing-line winding position. The fishing line is accordingly wound about the spool 4 while being moved from the bail 43 to the line roller 41.

Features (1) The drag knob 61 according to the aforementioned exemplary embodiment is the one for regulating the drag force of the drag mechanism 60 configured to brake the rotation of the spool 4 rotatably attached to the reel unit 2 for the fishing reel. The drag knob 61 includes the operating member 67, the coil spring 73, the receiver member 66, and the slide member 63. The operating member 67 is rotatably mounted to the reel unit 2. The coil spring 73 extends and contacts in the rotary axis direction (i.e., the right-and-left direction in FIGS. 1, 2, 3 and 5) of the operating member 67 in conjunction with the rotation of the operating member 67. The receiver member 66 receives urging force from the coil spring 73 and applies drag force to the spool 4. The slide member 63 is disposed between the coil spring 73 and the receiver member 66 in the rotary axis direction, and has a friction coefficient less than that of the receiver member 66.

The following advantageous effects can be achieved by the exemplary embodiment configured as described above. First, a well-known drag knob has the structure that the coil spring 73 makes contact with the receiver member 66. Therefore, friction force is generated between them and acts on the coil spring 73. In the present exemplary embodiment, in contrast, the slide member 63 is disposed between the coil spring 73 and the receiver member 66. Therefore, friction is caused between the coil spring 73 and the slide member 63, and circumferential friction force acts on the coil spring 73. Further, the slide member 63 has a friction coefficient less than that of the receiver member 66. Therefore, it is possible to further reduce the friction force acting on the coil spring 73 in comparison with the well-known drag knob structure. As a result, it is possible to inhibit the torsional deformation of the coil spring 73 attributed to friction force.

(2) The coil spring 73 according to the aforementioned exemplary embodiment has a rectangular cross-section in the axial direction. With use of the coil spring 73 formed in such shape, the coil spring 73 can be prevented from being curved in the radial direction. It should be noted that the friction force acting on the coil spring 73 can be reduced as described above, even when the coil spring 73 has a rectangular cross-section in the axial direction. Therefore, it is possible to inhibit the torsional deformation of the coil spring 73.

(3) The fishing reel according to the aforementioned exemplary embodiment includes the reel unit 2, the spool 4 and the drag mechanism 60. The spool 4 is rotatably mounted to the reel unit 2. The drag mechanism 60 includes the drag knob 61 and is configured to brake the rotation of the spool 4. As described above, it is possible to reduce the friction force acting on the coil spring 73 that is used in the drag knob 61. Therefore, it is possible to inhibit the torsional deformation of the coil spring 73.

MODIFICATIONS

The exemplary embodiment of the present invention has been explained above. However, the present invention is not limited to the above and a variety of changes and modifications can be made without departing from the scope of the present invention. Modifications will be respectively hereinafter explained.

Modification 1

Figure 9:
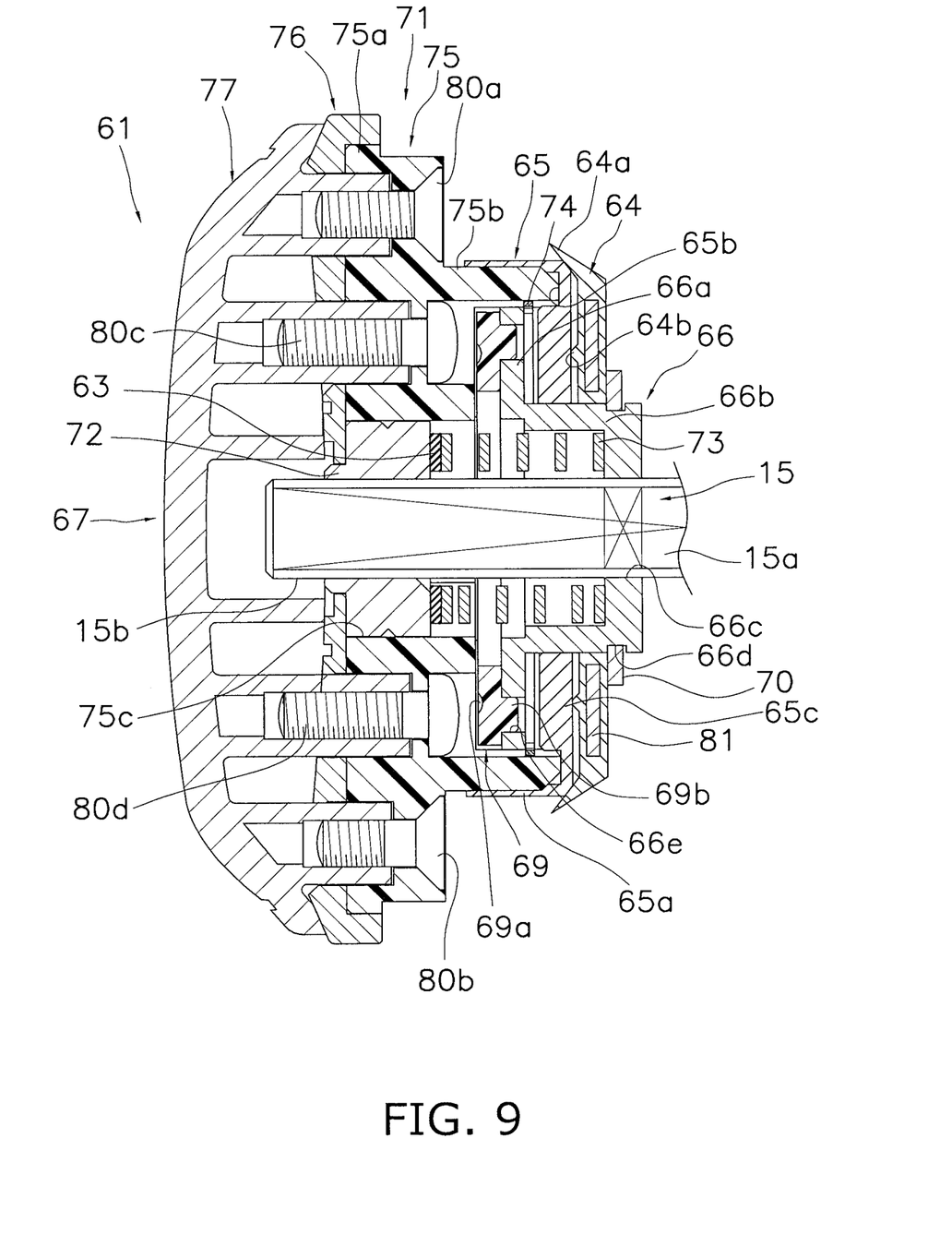
FIG. 9 is a cross-sectional side view of a drag knob according to a modification 1.

For example, in the aforementioned exemplary embodiment, the slide member 63 is disposed between the coil spring 73 and the receiver member 66. However, as illustrated in FIG. 9, the slide member 63 can be disposed between the coil spring 73 and the operating member 67. Alternatively, the slide members 63 can be disposed both between the coil spring 73 and the receiver member 66 and between the coil spring 73 and the operating member 67.

The drag knob 61 according to the present modification 1 is the one for regulating the drag force of the drag mechanism 60 configured to brake the rotation of the spool 4 rotatably attached to the reel unit 2 for the fishing reel. The drag knob 61 includes the operating member 67, the coil spring 73, the receiver member 66, and the slide member 63. The operating member 67 is rotatably mounted to the reel unit 2. The coil spring 73 extends and contracts in the rotary axis direction of the operating member 67 in conjunction with the rotation of the operating member 67. The receiver member 66 receives urging force from the coil spring 73 and applies drag force to the spool 4. The side member 63 is disposed between the coil spring 73 and the operating member 67 in the rotary axis direction and has a friction coefficient less than that of the operating member 67.

According to the structure, the slide member 63 is disposed between the coil spring 73 and the operating member 67. Therefore, friction is caused between the coil spring 73 and the slide member 63 and circumferential friction force acts on the coil spring 73, whereas in the well-known structure, friction is caused between the coil spring 73 and the slide member 63 and circumferential friction force on the coil spring 73. Further, the slide member 63 has a friction coefficient less than that of the operating member 67. Therefore, it is possible to further reduce the friction force acting on the coil spring 73 in comparison with the well-known drag knob structure. As a result, it is possible to inhibit the torsional deformation of the coil spring 73 attributed to friction force.

Modification 2

Figure 10:
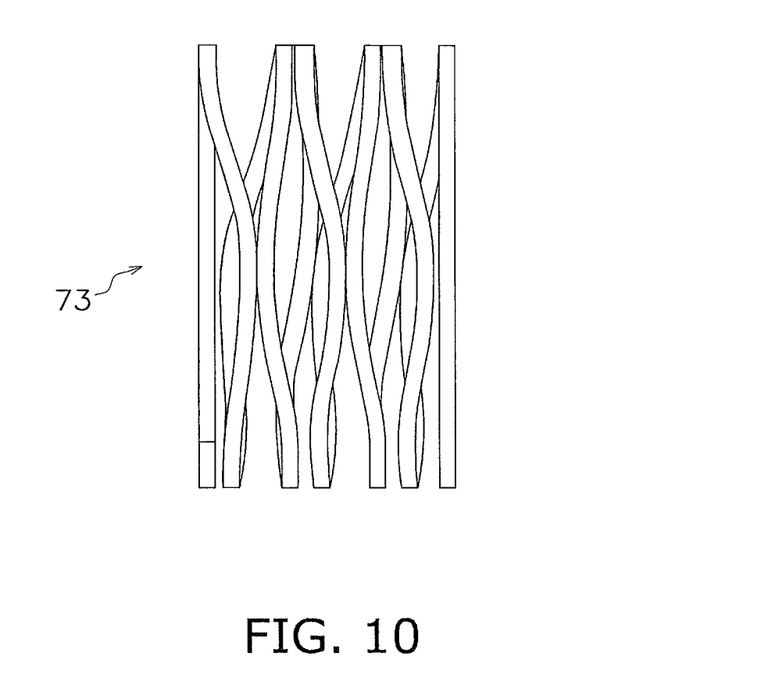
FIG. 10 is a side view of a coil spring according to a modification 2.

The coil spring 73 can be such a coiled wave spring as illustrated in FIG. 10. When explained in detail, the coil spring 73 can be produced by forming a wire rod in a convexo-concave shape in the axial direction and then by winding the convexo-concave portions consecutively in a wavy shape in a spiral direction. The coil spring 73 has a structure that the convex/concave portions of axially adjacent wound portions of the wire rod are opposed to each other and the opposed convex portions make contact with each other at the apices thereof. Thus, with use of such a coiled wave spring as the coil spring 73, urging force equivalent to that of a normal coil spring can be maintained, while the axial length thereof can be reduced than that of the normal coil spring.

Modification 3

The coil spring 73 can have a circular cross-section in the axial direction. In other words, such a coil spring can be used that is produced by forming a wire rod with a circular cross-section in a spiral shape. Even with such structure, similarly to the aforementioned exemplary embodiment, the friction force acting on the coil spring 73 can be reduced, while the torsional deformation of the coil spring 73 can be prevented.

Modification 4

In the slide member 63, at least either of the surface making contact with the coil spring 73 and the surface making contact with the receiver member 66 can not be formed in a flat shape. For example, lubricating oil, grease or the like can be used for further smoothening sliding among the coil spring 73, the slide member 63, and the receiver member 66. To keep such lubricating oil or grease, a groove or grooves can be formed on at least either of the surfaces of the slide member 63. The groove or grooves can be continuously or intermittently formed along the radial direction, or alternatively, can be continuously or intermittently formed along the circumferential direction. Yet alternatively, either a convex portion or a concave portion can be formed on at least either of the surfaces of the slide member 63.

Advantageous Effects of Invention

According to the present invention, the torsional deformation of a coil spring can be prevented in a drag knob and a fishing reel.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A drag knob for regulating drag three of a drag mechanism configured to brake rotation of a spool rotatably mounted to a reel unit of a fishing reel, the drag knob comprising:
   an operating member rotatably mounted to the reel unit;
   a coil spring being configured to extend and retract in a rotary axis direction of the operating member in conjunction with rotation of the operating member;
   a receiver member configured to receive an urging force of the coil spring and apply a drag force to the spool, and having a ring-shaped portion and a cylindrical portion, the cylindrical portion having a diameter less than a diameter of the ring-shaped portion; and
   a slide member disposed between the coil spring and the receiver member in the rotary axis direction, the slide member having a friction coefficient less than a friction coefficient of the receiver member.

2. The drag knob according to claim 1, wherein the coil spring has a rectangularly shaped axial cross-section.

3. The drag knob according to claim 1, wherein the coil spring is a coiled wave spring.

4. A fishing reel comprising:
   a reel unit;
   a spool rotatably being mounted to the reel unit; and
      a drag mechanism including the drag knob according to claim 1, the drag mechanism being configured to brake rotation of the spool.

5. A drag knob for regulating drag force of a drag mechanism configured to brake rotation of a spool rotatably mounted to a reel unit of a fishing reel, the drag knob comprising:
   an operating member rotatably mounted to the reel unit;
   a coil spring configured to extend and contract in a rotary axis direction of the operating member in conjunction with rotation of the operating member;
   a receiver member configured to receive an urging force of the coil spring and apply a drag force to the spool; and
   a slide member disposed between the coil spring and the operating member in the rotary axis direction, the slide member having a friction coefficient less than a friction coefficient of the operating member.

6. The drag knob according to claim 5, wherein the coil spring has a rectangularly shaped axial cross-section.

7. The drag knob according to claim 5, wherein the coil spring is a coiled wave spring.

8. The drag knob according to claim 5, wherein the receiver member has a ring shaped portion and a cylindrical portion, the cylindrical portion having a diameter less than a diameter of the ring-shaped portion.

* * * * *